(12) United States Patent
Ishii et al.

(10) Patent No.: US 7,545,464 B2
(45) Date of Patent: Jun. 9, 2009

(54) LIQUID CRYSTAL DISPLAY DEVICE

(75) Inventors: Hiromitsu Ishii, Mitaka (JP); Shigeru Morikawa, Hachioji (JP); Yayoi Nakamura, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 372 days.

(21) Appl. No.: 11/605,544

(22) Filed: Nov. 29, 2006

(65) Prior Publication Data

US 2007/0121038 A1    May 31, 2007

(30) Foreign Application Priority Data

Nov. 30, 2005    (JP) ............................. 2005-345614

(51) Int. Cl.
*G02F 1/1335*    (2006.01)
*G02F 1/1343*    (2006.01)

(52) U.S. Cl. ..................... 349/113; 349/139; 349/147

(58) Field of Classification Search .................. 349/147
See application file for complete search history.

(56) References Cited

U.S. PATENT DOCUMENTS 6,917,405 B2 *    7/2005    Kim ............................. 349/114

2004/0179157 A1 *    9/2004    Kim et al. .................... 349/114

FOREIGN PATENT DOCUMENTS

JP    2003-222854 A    8/2003

* cited by examiner

*Primary Examiner*—Michelle R. Connelly-Cushwa
*Assistant Examiner*—Chris Chu
(74) *Attorney, Agent, or Firm*—Frishauf, Holtz, Goodman & Chick, P.C.

(57) ABSTRACT

A liquid crystal display device has: a substrate; a switching element disposed at a side of the upper surface of the substrate and including a lower electrode and an upper electrode having a stacked structure of a plurality of metallic layers; a transparent pixel electrode disposed at the side of the upper surface of the substrate and connected to the upper electrode of the switching element; and a reflective plate formed on the upper surface of the pixel electrode so as to expose a part of the pixel electrode and having the same stacked structure as the upper electrode, including layers each made of the same material as the corresponding metallic layer in the upper electrode.

18 Claims, 5 Drawing Sheets ic crystal display device.

LIQUID CRYSTAL DISPLAY DEVICE

BACKGROUND OF THE INVENTION

1. Field of the Invention

The present invention relates to a liquid crystal display device.

2. Description of the Related Art

Conventional active matrix liquid crystal display devices include a type called semi-transmissive reflective type. A semi-transmissive reflective liquid crystal display device can realize both the system of turning on a backlight disposed at the side of the back surface of a liquid crystal display panel to allow an optical image that passes through the liquid crystal display panel to be viewed, and the system of turning off the backlight but irradiating external light from the side of the front surface of the liquid crystal display panel to allow an optical image that is reflected on a reflective layer formed in each pixel electrode formed on the liquid crystal display panel to be viewed. A liquid crystal display device described in Unexamined Japanese Patent Application KOKAI Publication No2003-222854 is known as a liquid crystal display device of this type. In the liquid crystal display device described in this publication, scanning lines (including the gate electrode of thin film transistors as switching elements) and reflective films which are both made of aluminum-based metal are formed on the upper surface of an active substrate, a gate insulating film is formed above these scanning lines and reflective films, the portions other than the gate electrode of the thin film transistors and data lines are formed on the upper surface of the gate insulating film, pixel electrodes whose area is larger than that of the reflective films are formed on the upper surface of the gate insulating film above the reflective films, the regions where the reflective films, which positionally overlap with the pixel electrodes, are arranged serve as reflective pixel regions, and a most part of the region of each pixel electrode other than the region where the pixel electrode and the reflective film positionally overlap, serves as transmissive pixel region.

However, in a case where this conventional liquid crystal display device is used as reflective type, external light that enters from the side of the display surface passes through the pixel electrodes and the gate insulating film to be reflected on the reflective films, and this reflected light passes through the gate insulating film and the pixel electrodes to be let out to the side of the display surface. Accordingly, since the external light passes through the pixel electrodes and the gate insulating film twice, there is a problem that the reflectivity drops due to such phenomena as absorption, interface reflection, interference phenomena, etc., and the displayed image is unfavorably colored.

Further, in a case where a liquid crystal display device as described above includes auxiliary capacitor electrodes, which are formed on the upper surface of the active substrate, and whose regions that positionally overlap with the pixel electrodes are to be used as reflective films, the area of the region of each auxiliary capacitor electrode that overlaps with the pixel electrode constitutes an auxiliary capacitor forming area and reflective area. However, since these areas often take different values, there is a problem that the degree of freedom in designing is limited.

Furthermore, in a case where the above-described liquid crystal display device has, on the upper surface of the active substrate, lower lines which are made of aluminum-based metal, the same material as the scanning lines and reflective films, and has, on the upper surface of the gate insulating film, upper lines which are made of chromium-based metal or the like, the same material as the data lines, and which are connected to the lower lines through contact holes formed in the gate insulating film, the surface of the lower lines made of aluminum-based metal is very easily oxidized. Since this promotes formation of a native oxide film having a high resistance on the surface of the lower lines, there is a problem that the contact resistance becomes unstable.

SUMMARY OF THE INVENTION

Hence, a first object of the present invention is to provide a liquid crystal display device capable of improving the reflectivity to reduce unfavorable coloring.

A second object of the present invention is to provide a liquid crystal display device which is, in addition to the above-described first object, capable of maintaining the stability of the contact resistance between given lines, even when a reflective plate is made of aluminum-based metal or the like.

Further, a third object of the present invention is to provide a liquid crystal display device which is, in addition to the above-described first object, capable of increasing the degree of freedom in designing.

To achieve the first object described above, a liquid crystal display device according to the present invention comprises: a substrate; a switching element disposed at a side of an upper surface of the substrate, and comprising a lower electrode and an upper electrode having a stacked structure of a plurality of metallic layers; a transparent pixel electrode disposed at the side of the upper surface of the substrate, and connected to the upper electrode of the switching element; and a reflective plate formed on an upper surface of the pixel electrode so as to expose a part of the pixel electrode, and having the same stacked structure as the upper electrode, which includes layers each made of a same material as a corresponding metallic layer in the upper electrode.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
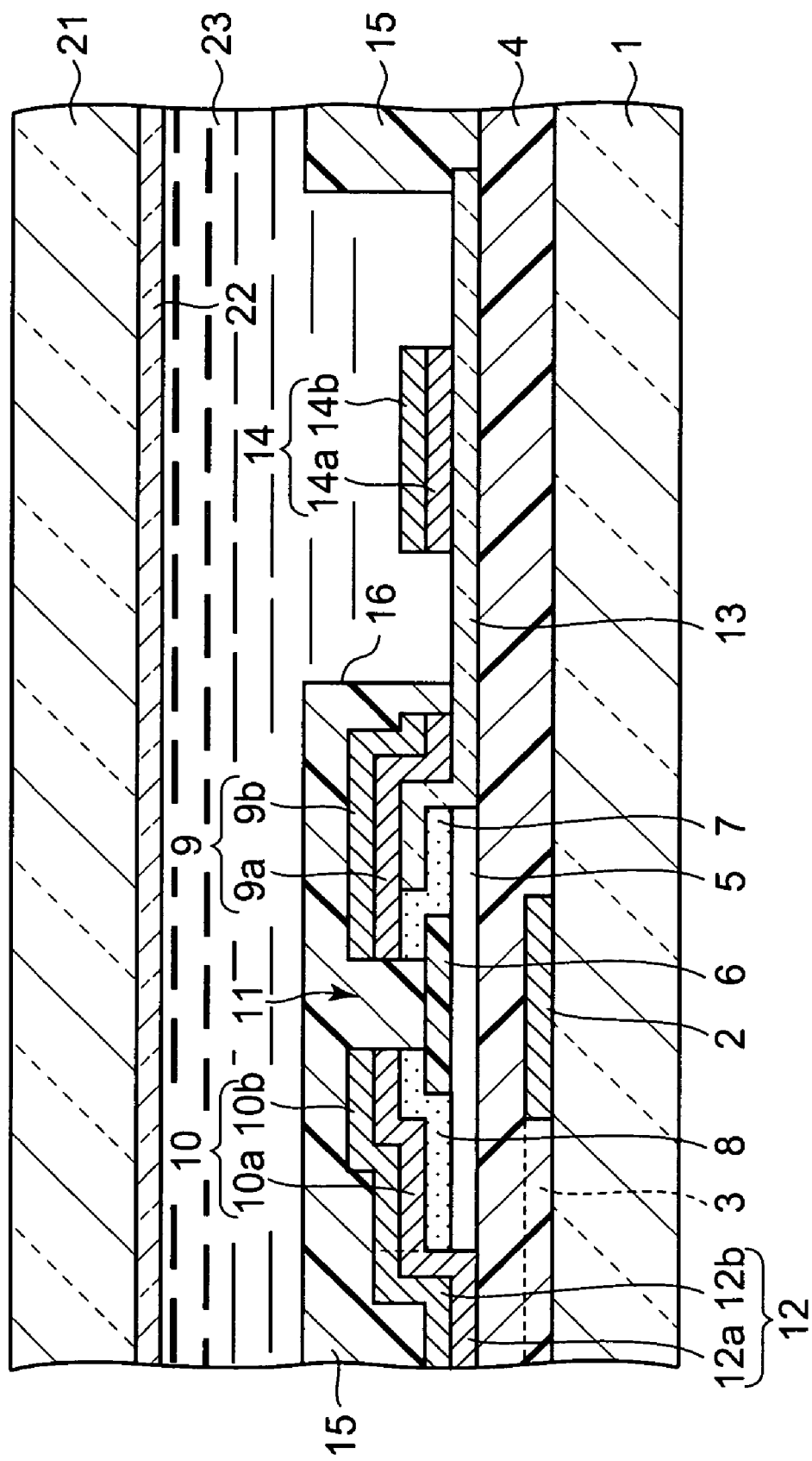
FIG. 1 is a cross sectional view of a principal part of a liquid crystal display device as a first embodiment of the present invention.

FIG. 1 shows a cross sectional view of a principal part of an active matrix semi-transmissive reflective type liquid crystal display device as the first embodiment of he present invention. This liquid crystal display device comprises an active substrate 1 and an opposing substrate 21, which are formed of a glass substrate or the like. The active substrate 1 has gate electrodes 2 formed at predetermined positions on its upper surface, and has scanning lines 3 formed so as to be connected to the gate electrodes 2. In this case, the gate electrodes 2 and the scanning lines 3 are made of chromium-based metal, molybdenum-based metal, titanium-based metal, tantalum-based metal, or the like (hereinafter referred to as high redox potential metal).

A gate insulating film 4 made of silicon nitride, silicon oxide, or the like is formed on the upper surface of the active substrate 1, the gate electrodes 2, and the scanning lines 3. A semiconductor thin film 5 made of intrinsic amorphous silicon is formed at a predetermined position of the upper surface of the gate insulating film 4 above the gate electrodes 2. A channel protecting film 6 made of silicon nitride, silicon oxide, or the like is formed at a predetermined position of the upper surface of the semiconductor thin film 5.

Ohmic contact layers 7 and 8 made of n type amorphous silicon are formed at both sides of the upper surface of the channel protecting film 6 and on the upper surface of the semiconductor thin film 5 appearing at both sides of the channel protecting film 6. A source electrode 9 and a drain electrode 10 are formed on the upper surface of the ohmic contact layers 7 and 8 respectively. In this case, the source electrode 9 and the drain electrode 10 each have a two-layered structure including a lower metallic film 9a or 10a made of high redox potential metal, and an upper metallic film 9b or 10b formed on the upper surface of the lower metallic film 9a or 10a and made of high reflectivity metal such as aluminum-based metal, silver-based metal, etc. (hereinafter referred to as high reflectivity metal) whose redox potential is lower than that of pixel electrodes 13 to be described later, and whose reflectivity is higher than that of the lower metallic film 9a or 10a.

The gate electrode 2, the gate insulting film 4, the semiconductor thin film 5, the channel protecting film 6, the ohmic contact layers 7 and 8, and the source electrode 9 and drain electrode 10 constitute a thin film transistor 11 serving as a switching element. In this case, the source electrode 9 and drain electrode 10 constitute the upper electrode of the thin film transistor 11.

Data lines 12 are formed at predetermined positions on the upper surface of the gate insulating film 4. In this case, the data lines 12 have a two-layered structure including a lower metallic film 12a made of high redox potential metal and an upper metallic film 12b formed on the upper surface of the lower metallic film 12a and made of high reflectivity metal such as aluminum-based metal, etc. Pixel electrodes 13 made of ITO (Indium Tin Oxide) or the like are formed at predetermined positions on the upper surface of the gate insulating film 4. The pixel electrodes 13 are connected to the lower metallic film 9a of the source electrode 9 and the ohmic contact layer 7 thereunder.

A reflective plate 14 whose area is smaller than that of the pixel electrode 13 is formed at a predetermined position on the upper surface of the pixel electrode 13. In this case, the reflective plate 14 has a two-layered structure including a lower metallic film 14a made of high redox potential metal, and an upper metallic film 14b formed on the upper surface of the lower metallic film 14a and made of high reflectivity metal such as aluminum-based metal, etc. The lower metallic film 14a is made of the same material as the lower metallic film 9a of the source electrode 9 and lower metallic film 10a of the drain electrode 10. Further, the upper metallic film 14b is made of the same material as the upper metallic film 9b of the source electrode 9 and upper metallic film 10b of the drain electrode 10. An overcoat film 15 made of silicon nitride or the like is formed on the upper surface of the gate insulating film 4, the thin film transistor 11, and the peripheral portions of the data lines 12 an pixel electrode 13. An opening portion 16 is formed in the overcoat film 15, at a position corresponding to the center of the pixel electrode 13 so as to include the reflective plate 14.

On the other hand, an opposing electrode 22 made of ITO is formed on the lower surface of the opposing substrate 21. The active substrate 1 and the opposing substrate 21 are adhered to each other with a sealing member (unillustrated) therebetween. Liquid crystal 23 is sealed between the substrates 1 and 21 inside the sealing member.

In the present liquid crystal display device, the reflective plate 14 having a smaller area than that of the pixel electrode 13 is formed at a predetermined position on the upper surface of the pixel electrode 13. Therefore, in each pixel electrode 13, the region where the reflective plate 14, which is overlaid on the pixel electrode 13, is arranged serves literally as reflective pixel region, and the major part of the pixel electrode 13, other than the region overlaid with the reflective film 14, serves as substantial transmissive pixel region.

In a case where the present liquid crystal display device is used as transmissive type, a backlight (unillustrated) disposed at the side of the lower surface of the active substrate 1 is turned on, and the light from the backlight passes through the active substrate 1, the gate insulating film 4, the substantial transmissive pixel region of the pixel electrode 13, the liquid crystal 23, the opposing electrode 22, and the opposing substrate 21 to be emitted to the side of the upper surface (display side) of the opposing substrate 21, thereby displaying an image.

On the other hand, in a case where the present liquid crystal display device is used as reflective type, the backlight is not turned on, but external light that enters from the side of the upper surface of the opposing substrate 21 passes through the opposing substrate 21, the opposing electrode 22, and the liquid crystal 23 to be reflected on the upper metallic film 14b of the reflective plate 14 and emitted to the side of the upper surface of the opposing substrate 21 through a light path reverse to the above, thereby displaying an image. In this case, since the external light, which contributes to the displaying, does not at all pass through the pixel electrode 13 and gate insulating film 4, the reflectivity can be improved and unfavorable coloring can be eliminated.

Here, in the present liquid crystal display device, the reflective plate 14 has the two-layered structure in which the upper metallic layer 14b made of high reflectivity metal such as aluminum-based metal, etc. is formed on the upper surface of the lower metallic film 14a made of high redox potential metal. The first reason for this is that the reflective film 14 needs to be made of high reflectivity metal such as aluminum-based metal, etc., because the reflective plate 14 is used literally as reflective plate. The second reason therefor is that the reflective plate 14 needs to have a fine contact between the pixel electrode 13 and itself, because it is formed on the upper surface of the pixel electrode 13 made of ITO.

Hence, in the present liquid crystal display device, the reflective plate 14 is of the two-layered structure of the lower metallic film 14a made of high redox potential metal capable of developing a direct electric contact to the pixel electrode 13 made of ITO, and the upper metallic film 14b made of high reflectivity metal such as aluminum-based metal, etc.

Further, in a case where aluminum-based metal is used to form the reflective plate 14, it is desired that the reflective plate 14 be formed on the upper surface of the pixel electrode 13 like a floating island. This is for preventing a cell reaction between the upper metallic film 14b made of high reflectivity metal such as aluminum-based metal, etc., and the pixel electrode 13 made of ITO, in forming the opening portion 16 in the formed overcoat film 15 by photolithography. In this case, the material of the lower metallic film 14a should be a high redox potential metal whose redox potential is equal to or higher than that of ITO.

Next, one example of forming the reflective plate 14 in the preset liquid crystal display device will be explained. First, after the pixel electrodes 13 are formed, a lower metallic film forming film made of high redox potential metal and an upper metallic film forming film made of high reflectivity metal such as aluminum-based metal, etc., are sequentially formed by sputtering.

Next, the upper metallic film forming film and the lower metallic film forming film are sequentially etched by photolithography, thereby the two-layered source electrode 9 and drain electrode 10 and the data lines 12 are formed at the same time when the two-layered reflective 14 is formed. Like this, since the reflective plate 14 can be formed simultaneously with the formation of the source electrode 9, the drain electrode 10, and the data lines 12, it is possible to suppress the number of manufacturing steps.

Note that with a view to protecting the thin film transistor 11 from, for example, static electricity, there is known a method of forming a static protecting ring so as to surround the display area and connecting the protecting ring to the scanning lines 3 or the data lines 12 via a static protecting element to build up a static protecting structure. Generally, such a static protecting ring has a structure in which a pair of lower lines are formed on the same layer where the gate electrodes 2 and scanning lines 3 are formed, so as to extend in parallel with the scanning lines 3, and a pair of upper lines, which are formed on the same layer where the data lines 12 are formed so as to extend in parallel with the data lines 12, are connected to the lower lines through contact holes.

In case of adopting such a static protecting structure in the present invention, the static protecting ring, though not illustrated, is structured such that a pair of lower lines made of high redox potential metal, the same material as the gate electrodes 2 and scanning lines 3, are formed on the upper surface of the active substrate 1, and a pair of upper lines having the same two-layered structure as the reflective plate 14 are formed on the upper surface of the gate insulating film 4 so as to be connected to the lower lines through contact holes formed in the gate insulating film 4. Therefore, even if a native oxide film having a high resistance is formed on the surface of the upper metallic film of the two-layered upper lines, that is made of high reflectivity metal such as aluminum-based metal, etc., the contact resistance between the lower metallic film of the two-layered upper lines and the lower lines will not become unstable. Accordingly, no problem arises by forming the upper metallic film 14b of the reflective plate 14 with the use of a high reflectivity metal such as aluminum-based metal, etc.

Second Embodiment

Figure 2:
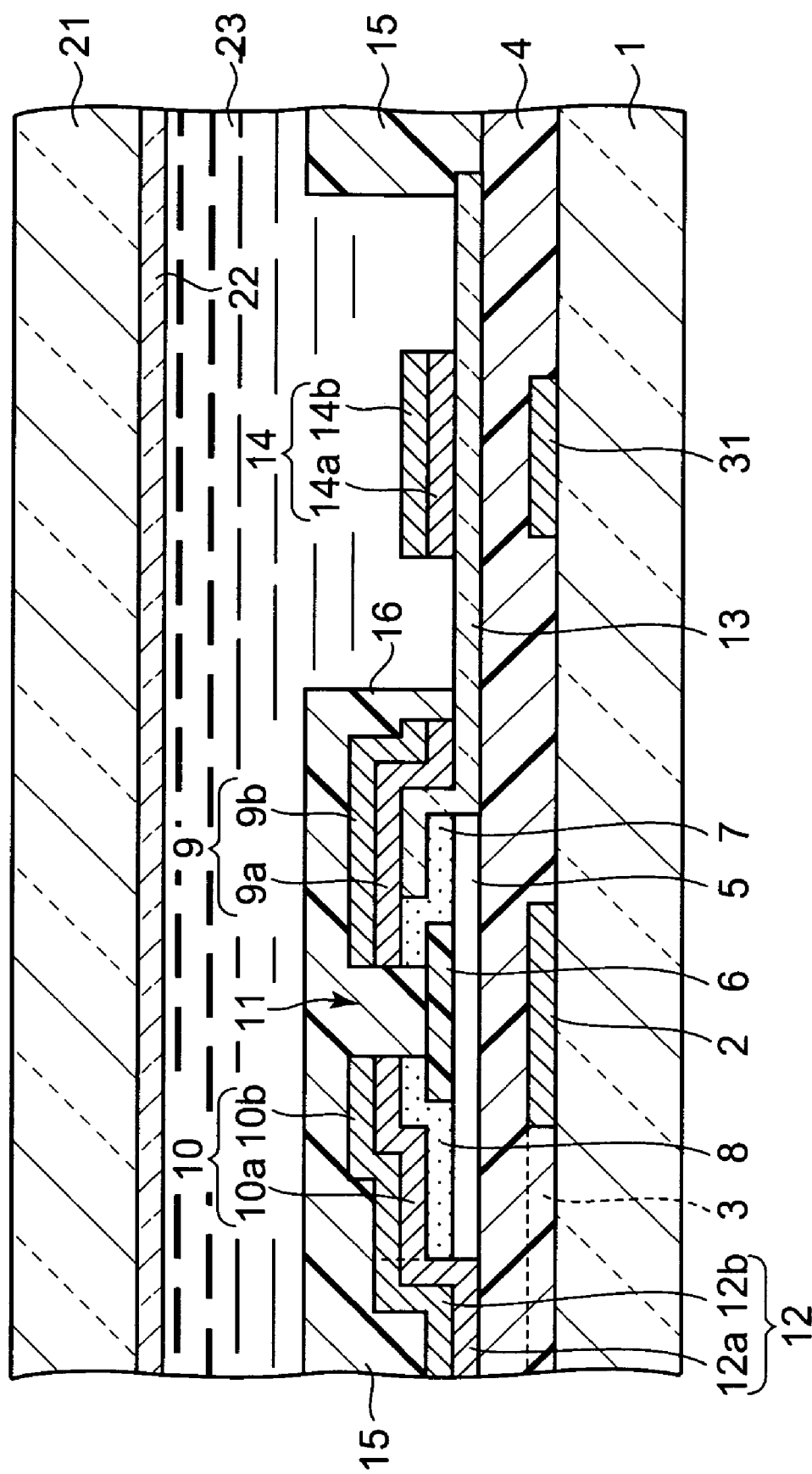
FIG. 2 is a cross sectional view of a principal part of a liquid crystal display device as a second embodiment of the present invention.

FIG. 2 shows a cross sectional view of a principal part of a liquid crystal display device as the second embodiment of the present invention. The present liquid crystal display device differs from the liquid crystal display device of FIG. 1, in that auxiliary capacitor electrodes 31 made of the same material as the gate electrode 2 and scanning lines 3 are formed on the upper surface of the active substrate 1 under the reflective plate 14. In this case, the auxiliary capacitor electrodes 31 are arranged in parallel with the scanning lines 3.

In the present liquid crystal display device, the width of the auxiliary capacitor electrode 31 in the left and right direction of FIG. 2 is set to be equal to or smaller than the length of the reflective plate 14 in the same direction, so that the auxiliary capacitor forming area, which is defined by the region where the auxiliary capacitor electrode 31 and the pixel electrode 13 overlap with each other, can arbitrarily be selected irrespective of the reflective area of the reflective plate 14, within the range of the length of the reflective plate 14 in that direction. Thus, the degree of freedom in designing can be increased.

In FIG. 2, the scanning lines 3 may be omitted and the auxiliary capacitor electrode 31 may be connected to the gate electrode of the previous thin film transistor connected to the previous pixel electrode arranged at the previous stage of each pixel electrode 13. In other words, in FIG. 2, each scanning line 3 may serve as an auxiliary capacitor electrode, which is formed under the following pixel electrode arranged at the following stage of each pixel electrode 13. That is, in FIG. 2, the auxiliary capacitor electrode 31 may serve also as the scanning line 3 that is connected to the gate electrode of the previous thin film transistor connected to the previous pixel electrode.

Third Embodiment

Figure 3:
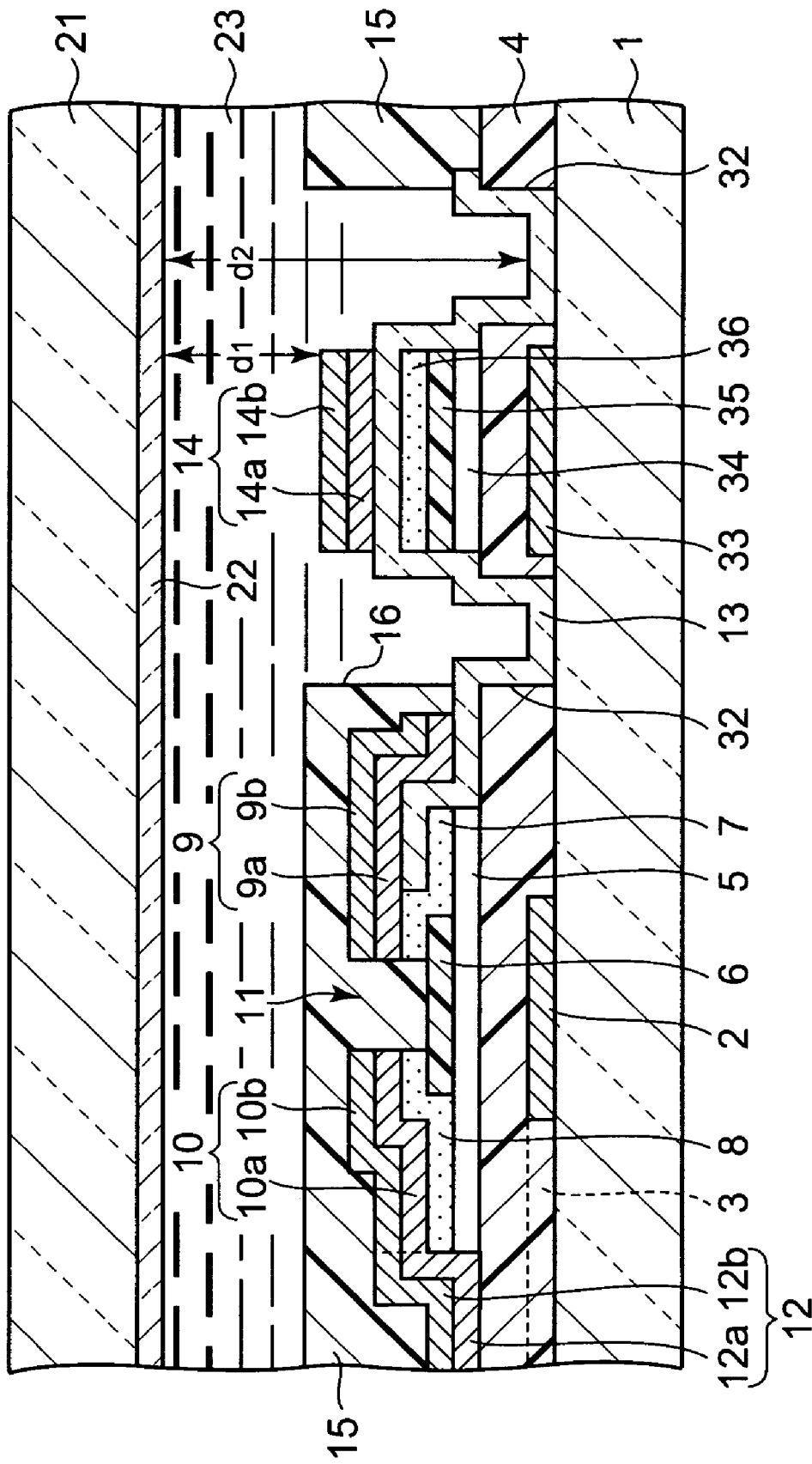
FIG. 3 is a cross sectional view of a principal part of a liquid crystal display device as a third embodiment of the present invention.

FIG. 3 is a cross sectional view of a principal part of a liquid crystal display device as the third embodiment of the present invention. The present liquid crystal display device differs from the liquid crystal display device shown in FIG. 1, only in the structure of the pixel electrode 13. That is, first, opening portions 32 are formed in the gate insulating film 4 around the region where the reflective plate 14 is to be formed, within the substantial transmissive pixel region.

Second, a first gap fill film 33 made of the same material as the gate electrode 2 and scanning line 3 is formed on the upper surface of the active substrate 1 under the region where the reflective plate 14 is to be formed, and second to fourth gap fill films 34 to 36 made of the same material as the semiconductor thin film 5, the channel protecting film 6, and the ohmic contact layers 7 and 8 respectively are formed on the upper surface of the gate insulating film 4 above the first gap fill film 33. The pixel electrode 13 and the two-layered reflective plate 14 are formed above thee gap fill films 34 to 36.

Accordingly, in the present liquid crystal display device, the upper surface of the reflective layer 14 is higher than that of the liquid crystal display device shown in FIG. 1, by a quantity amounting to the total thickness of the first to fourth gap fill films 33 to 36, and the upper surface of the pixel electrode 13 in the substantial transmissive pixel region is lower than that of the liquid crystal display device shown in FIG. 1, by a quantity amounting to the thickness of the gate insulating film 4.

Then, when the gap $d_1$ between the reflective plate 14 and the opposing electrode 22 is brought close to ½ of the gap $d_2$ between the pixel electrode 13 in the substantial transmissive pixel region and the opposing electrode 22, a multi-gap structure in which the reflectivity and the transmissivity are both optimized is available. However, in this case, the gap $d_1$ may arbitrarily be selected within the range of appropriate combinations of the first to fourth gap fill films 33 to 36.

Fourth Embodiment

Figure 4:
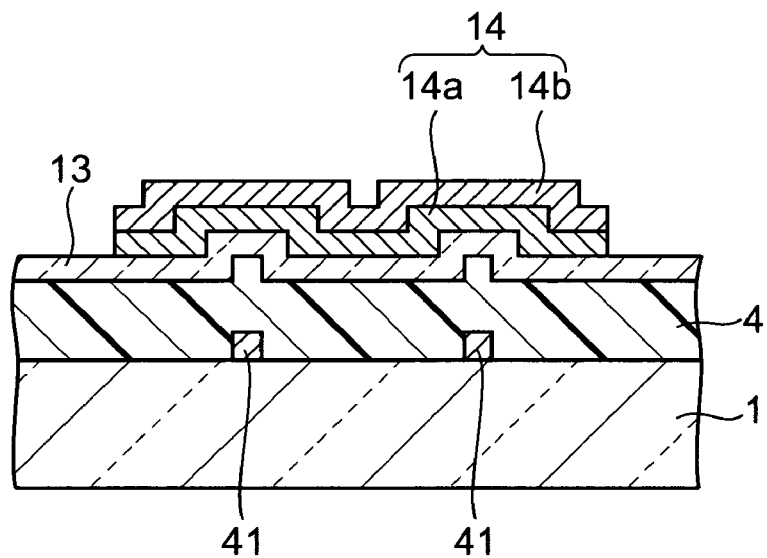
FIG. 4 is a cross sectional view of a portion around a reflective plate in a liquid crystal display device as a fourth embodiment of the present invention.

FIG. 4 shows a cross sectional view of a portion around the reflective plate 14 in a liquid crystal display device as the fourth embodiment of the present invention. The present liquid crystal display device differs from the liquid crystal display device shown in FIG. 1, in that step forming films (step forming patterns) 41 having a dot shape or a linear shape made of the same material as the gate electrodes 2 and scanning lines 3 are appropriately formed on the upper surface of the active substrate 1 within the region where the reflective plate 14 is to be formed, and the respective upper surfaces of the pixel electrode 13 and lower metallic film 14a and upper metallic film 14b of the reflective plate 14 are formed to be embossed and recessed to follow the embossed and recessed upper surface of the active substrate 1 including the step forming films 41. In this case, the effect of light scattering reflection can be obtained from the embossed and recessed upper surface of the upper metallic film 14b of the reflective plate 14.

Fifth Embodiment

Figure 5:
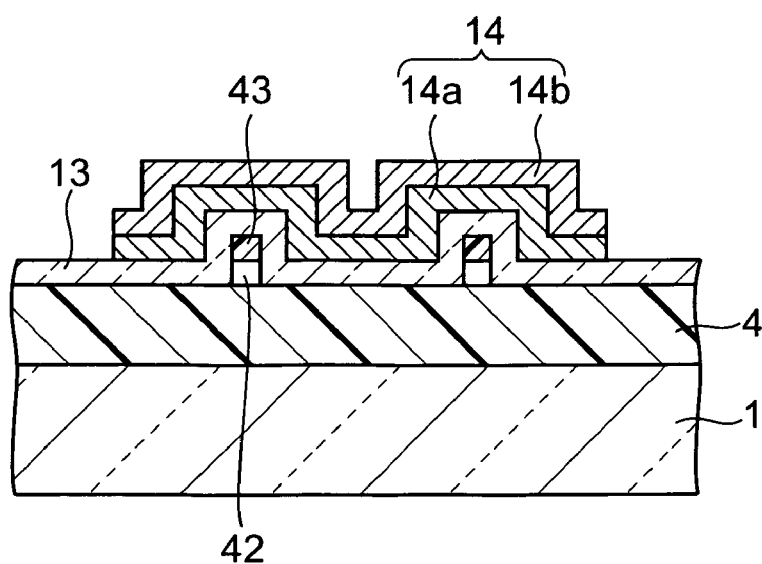
FIG. 5 is a cross sectional view of a portion around a reflective plate in a liquid crystal display device as a fifth embodiment of the present invention.

FIG. 5 shows a cross sectional view of a portion around the reflective plate 14 in a liquid crystal display device as the fifth embodiment of the present invention. The present liquid crystal display device differs from the liquid crystal display device shown in FIG. 4, in that step forming films (step forming patterns) 42 and 43 made of the same materials as the semiconductor thin film 5 and channel protecting film 6 respectively, and together forming a two-layered structure having a dot shape or a linear shape, are appropriately formed on the upper surface of the gate insulating film 4 within the region where the reflective plate 14 is to be formed, and the respective upper surfaces of the pixel electrode 13 and lower metallic film 14a and upper metallic film 14b of the reflective plate 14 are formed to be embossed and recessed to follow the embossed and recessed upper surface of the gate insulating film 4 including the two-layered step forming films 42 and 43. Also in this case, the function of light scattering reflection can be obtained from the embossed and recessed upper surface of the upper metallic film 14b of the reflective plate 14.

Sixth Embodiment

Figure 6:
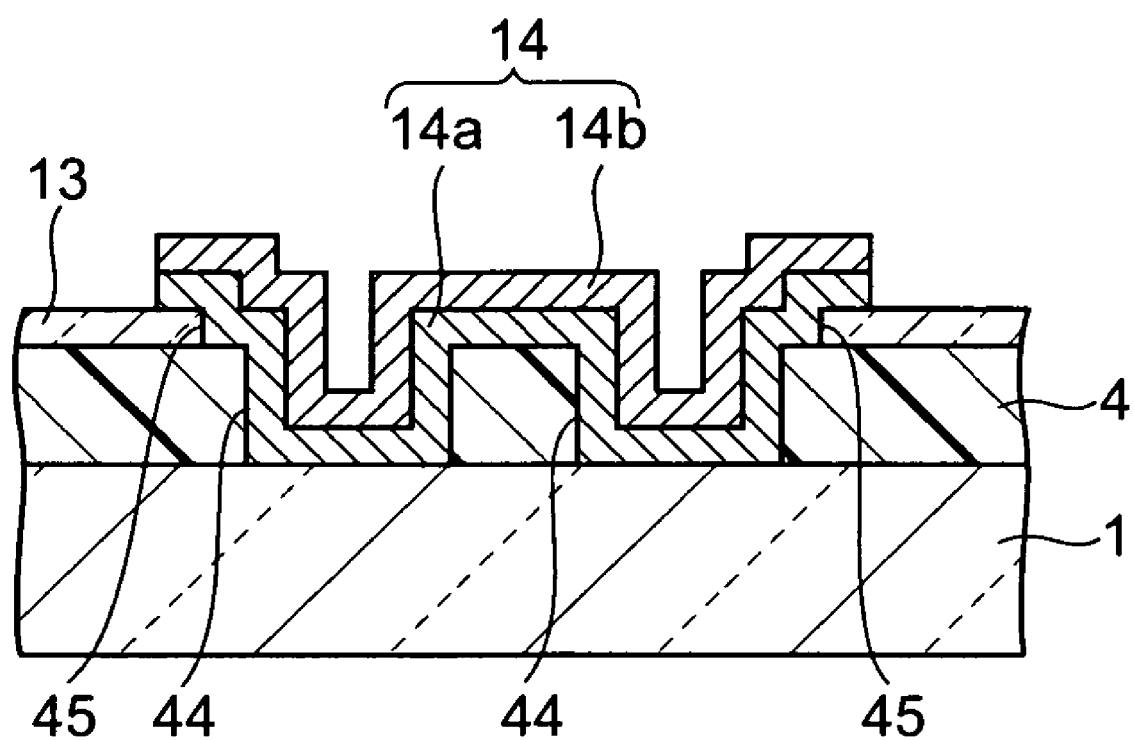
FIG. 6 is a cross sectional view of a portion around a reflective plate in a liquid crystal display device as a sixth embodiment of the present invention.

FIG. 6 shows a cross sectional view of a portion around the reflective plate 14 in a liquid crystal display device as the sixth embodiment of the present invention. The present liquid crystal display device differs from the liquid crystal display device shown in FIG. 4, in that step forming recessions (step forming patterns) 44 having a dot shape or a linear shape are appropriately formed in the gate insulating film 4 within the region where the reflective plate 14 is to be formed, pixel electrodes 13 each having an opening portion 45, which is slightly smaller than the region where the reflective plate 14 is to be formed, are formed on the upper surface of the gate insulating film 4 (the depth of the opening portion 45 in the direction vertical to the sheet of FIG. 6 is smaller than the depth of the pixel electrode 13, so the left and right pixel electrodes 13 in FIG. 6 are continuous), and the respective upper surfaces of the lower metallic film 14a and upper metallic film 14b of the reflective plate 14 are formed to be embossed and recessed to follow the embossed and recessed upper surfaces of the gate insulating film 4 and pixel electrode 13 including the step forming recessions 44 and opening portion 45. Also in this case, the function of light scattering reflection can be obtained from the embossed and recessed upper surface of the upper metallic film 14b of the reflective plate 14.

Another Embodiment

In case of the example shown in FIG. 5, the two-layered step forming films 42 and 43 may be made of the same materials as the semiconductor thin film and ohmic contact layers 7 and 8. Further, complex light scattering reflection patterns may be formed by appropriately combining such light scattering reflection patterns of various types as described above.

According to the present invention, the reflective plate, which exposes a part of the pixel electrode, is formed on the upper surface of the pixel electrode. Therefore, in the use as a reflective type, external light is reflected on the reflective plate formed on the upper surface of the pixel electrode, but the external light, which contributes to the image display, does not at all pass through the pixel electrode. Accordingly, the reflectivity is improved and coloring can be eliminated. In this case, the reason the reflective plate is formed to have the same structure as the upper electrode constituting the switching element is not to increase the number of manufacturing steps.

Further, in the case where the upper electrode, which constitutes the switching element, and the reflective plate are formed to have a two-layered structure including a lower metallic film made of metal capable of direct electric contact to the pixel electrode, and an upper metallic film formed on the upper surface of the lower metallic film and made of high reflectivity metal, even when the reflective plate is made of aluminum-based metal or the like, it is possible to keep the contact resistance between certain wires from becoming unstable.

Furthermore, by forming an auxiliary capacitor electrode, via the insulating film, under the pixel electrode under the reflective plate, such that the width of the auxiliary capacitor electrode is equal to or smaller than the length of the reflective plate in the same direction, it is possible to set the auxiliary capacitor forming area and the reflective area separately, thereby to increase the degree of freedom in designing.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-345614 filed on Nov. 30, 2005 and including specification, claims, drawings and summary. The disclosure of the above Japanese Patent Application is incorporated herein by reference in its entirety.

What is claimed is:

1. A liquid crystal display device, comprising:
   a substrate;
   a switching element disposed at a side of an upper surface of the substrate, and comprising an upper electrode having a stacked structure of a plurality of metallic layers, and a lower electrode;
   a transparent pixel electrode disposed at the side of the upper surface of the substrate, and connected to the upper electrode of the switching element; and
   a reflective plate formed on an upper surface of the pixel electrode so as to expose a part of the pixel electrode, and having the same stacked structure as the upper electrode, which includes layers each made of a same material as a corresponding metallic layer in the upper electrode.

2. The liquid crystal display device according to claim 1, wherein the upper electrode constituting the switching element and the reflective plate comprising a lowermost metallic film and an uppermost metallic film, the lowermost metallic film has a redox potential which is equal to or higher than that of the pixel electrode, and the uppermost metallic film has a redox potential which is lower than that of the pixel electrode and has a reflectivity which is higher than that of the lowermost metallic film.

3. The liquid crystal display device according to claim 1, wherein an auxiliary capacitor electrode made of a same material as the lower electrode of the switching element is formed on the substrate.

4. The liquid crystal display device according to claim 3, wherein an insulating film, which covers the lower electrode of the switching element and the auxiliary capacitor electrode, is formed on the substrate, the auxiliary capacitor electrode is disposed under the pixel electrode, within a region corresponding to the reflective plate, and both side edges of the auxiliary capacitor electrode in its widthwise direction do not protrude from side edges of the reflective plate in the corresponding widthwise direction respectively.

5. The liquid crystal display device according to claim 1, wherein the switching element further comprises a semiconductor layer, and a gap fill film, which is made of a same material as at least one of components constituting the switching element, except the upper electrode, is formed under the pixel electrode within a region corresponding to the reflective plate.

6. The liquid crystal display device according to claim 5, wherein the gap fill film is made of a same material as the lower electrode of the switching element.

7. The liquid crystal display device according to claim 5, wherein the gap fill film is made of a same material as the semiconductor layer of the switching element.

8. The liquid crystal display device according to claim 5, wherein the switching element further comprises an insulating layer, and the gap fill film is made of a same material as the insulating layer of the switching element.

9. The liquid crystal display device according to claim 5, wherein the switching element further comprises an insulating layer, and the gap fill film has a stacked structure including a first layer made of a same material as the lower electrode of the switching element, a second layer made of a same material as the semiconductor layer of the switching element, and a third layer made of a same material as the insulating layer of the switching element.

10. The liquid crystal display device according to claim 5, wherein an insulating film, which covers the lower electrode of the switching element and the gap fill film and has a recessed portion around the gap fill film, is formed on the substrate, and the pixel electrode has a portion which is formed on an upper surface of the insulating film and a portion which is formed in the recessed portion of the insulating film.

11. The liquid crystal display device according to claim 1, wherein a step forming layer is formed under the reflective plate, and an upper surface of the reflective plate is embossed and recessed so as to follow the step forming layer.

12. The liquid crystal display device according to claim 11, wherein the step forming layer is formed on the substrate, and an insulating film which covers the step forming layer is formed on the substrate.

13. The liquid crystal display device according to claim 11, wherein the step forming layer includes at least layer made of a same material as the lower electrode.

14. The liquid crystal display device according to claim 11, wherein the switching element further comprises a semiconductor layer, and the step forming layer includes at least a layer made of a same material as the semiconductor layer.

15. The liquid crystal display device according to claim 11, wherein the switching element further comprises an insulating layer, and the step forming layer includes at least a layer made of a same material as the insulating layer.

16. The liquid crystal display device according to claim 1, wherein an insulating film, which has a step forming pattern including a recessed portion and an embossed portion at least within a region corresponding to the reflective plate, is formed on the substrate, and the pixel electrode is formed only around the step forming pattern.

17. The liquid crystal display device according to claim 16, wherein the reflective plate is formed in the recessed portion of the step forming pattern and on the embossed portion thereof, so as to be electrically connected to the pixel electrode formed around the step forming pattern.

18. A liquid crystal display device, comprising:
a substrate;
a thin film transistor formed at a side of an upper surface of the substrate and comprising a gate electrode, a gate insulating film, a semiconductor layer, and a source electrode and drain electrode each having a stacked structure of a plurality of metallic films;
a pixel electrode formed on the gate insulating film, connected to the source electrode of the thin film transistor, and made of transparent oxide metallic film; and
a reflective layer formed on the pixel electrode so as to expose a part of the pixel electrode, and having a stacked structure including metallic layers made of same materials as the source electrode and drain electrode,
wherein the source electrode and drain electrode, which constitute the thin film transistor, and the reflective layer comprise a lowermost metallic film and an uppermost metallic film, the lowermost metallic film has a redox potential which is equal to or higher than that of the pixel electrode, and the uppermost metallic film has a redox potential which is lower than that of the pixel electrode and has a reflectivity which is higher than that of the lowermost metallic film.

* * * * *